US012394351B2

(12) United States Patent
Pyun et al.

(10) Patent No.: US 12,394,351 B2
(45) Date of Patent: Aug. 19, 2025

(54) DISPLAY APPARATUS AND METHOD OF DRIVING THE SAME

(71) Applicant: Samsung Display Co., Ltd., Yongin-Si (KR)

(72) Inventors: Kihyun Pyun, Gwangmyeong-si (KR); Jang-Mi Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 37 days.

(21) Appl. No.: 18/128,142

(22) Filed: Mar. 29, 2023

(65) Prior Publication Data

US 2023/0386385 A1 Nov. 30, 2023

(30) Foreign Application Priority Data

May 26, 2022 (KR) ........................ 10-2022-0064701

(51) Int. Cl.
*G09G 3/20* (2006.01)

(52) U.S. Cl.
CPC ......... *G09G 3/2007* (2013.01); *G09G 3/2096* (2013.01); *G09G 2320/0242* (2013.01); *G09G 2330/025* (2013.01); *G09G 2330/028* (2013.01)

(58) Field of Classification Search
CPC ............... G09G 3/2007; G09G 3/2096; G09G 2320/0242; G09G 2330/025; G09G 2330/028; G09G 3/20; G09G 3/3208; G09G 3/3607; G09G 3/3291; G09G 3/006; G09G 3/2003; G09G 5/02; G09G 2320/0271; G01R 19/165
See application file for complete search history.

(56) References Cited

U.S. PATENT DOCUMENTS 11,699,388 B2 * 7/2023 Yoon .................... G09G 3/3225 345/55
2015/0310808 A1 * 10/2015 Lee ...................... G09G 3/2007 345/77
2017/0053587 A1 * 2/2017 Kim ...................... G09G 3/2092
2018/0293929 A1 * 10/2018 Shigeta ................ G09G 3/3233
2020/0251045 A1 * 8/2020 An ........................... G09G 3/32
2020/0335033 A1 * 10/2020 Kim ..................... G09G 3/3688

FOREIGN PATENT DOCUMENTS

KR 10-2014-0130017 A 11/2014
KR 10-2015-0017528 A 2/2015
KR 20150017528 A * 2/2015
KR 10-2016-0022973 A 3/2016
KR 10-2016-0092552 A 8/2016
KR 10-2016-0119909 A 10/2016

* cited by examiner

*Primary Examiner* — Temesghen Ghebretinsae
*Assistant Examiner* — K. Kiyabu
(74) *Attorney, Agent, or Firm* — Innovation Counsel LLP

(57) ABSTRACT

A display apparatus includes a display panel, a power voltage generator, a current sensor, a driving controller and a data driver. The power voltage generator is configured to generate a power voltage and output the power voltage to the display panel. The current sensor is configured to sense a panel current of the display panel and output an overcurrent signal based on the panel current being greater than a threshold value. The driving controller is configured to generate a compensation value based on the overcurrent signal and generate a data signal to which the compensation value is applied. The data driver is configured to generate a data voltage based on the data signal and output the data voltage to the display panel.

20 Claims, 9 Drawing Sheets

DISPLAY APPARATUS AND METHOD OF DRIVING THE SAME

PRIORITY STATEMENT

This application claims priority under 35 U.S.C. § 119 to Korean Patent Application No. 10-2022-0064701 filed on May 26, 2022 in the Korean Intellectual Property Office (KIPO), the content of which is herein incorporated by reference in its entirety.

BACKGROUND

1. Field

Embodiments of the present inventive concept relate to a display apparatus and a method of driving the display apparatus. More particularly, embodiments of the present inventive concept relate to a display apparatus enhancing a display quality of a display panel by preventing a color shift of a display image in an overcurrent preventing mode and a method of driving the display apparatus.

2. Description of the Related Art

Generally, a display apparatus includes a display panel and a display panel driver. The display panel includes a plurality of gate lines, a plurality of data lines and a plurality of pixels. The display panel driver includes a gate driver and a data driver. The gate driver outputs gate signals to the gate lines. The data driver outputs data voltages to the data lines.

The display panel driver further includes a sensing part receiving a sensing signal from the pixel. The display panel driver further includes a power voltage generator outputting a power voltage to the display panel. The display panel driver further includes a driving controller controlling an operation of the gate driver, an operation of the data driver and an operation of the power voltage generator.

The driving controller may sense a panel current of the display panel. When the panel current is greater than a predetermined current, the driving controller may decrease the power voltage. When the panel current is greater than the predetermined current and the driving controller does not decrease the power voltage, the display apparatus may be damaged due to an overcurrent. However, when the power voltage is decreased, a color shift of the display image of the display panel may occur so that the display quality of the display panel may be deteriorated.

SUMMARY

A display apparatus enhancing a display quality of a display panel by preventing a color shift of a display image in an overcurrent preventing mode is disclosed.

A method of driving the display apparatus is disclosed.

According to the present inventive concept, a display apparatus that includes a display panel, a power voltage generator, a current sensor, a driving controller and a data driver is disclosed. The power voltage generator is configured to generate a power voltage and output the power voltage to the display panel. The current sensor is configured to sense a panel current of the display panel and output an overcurrent signal when the panel current is greater than a threshold value. The driving controller is configured to generate a compensation value based on the overcurrent signal and generate a data signal that is processed with the compensation value. The data driver is configured to generate a data voltage based on the data signal and output the data voltage to the display panel.

The compensation value may include a first color compensation value, a second color compensation value and a third color compensation value.

The first color compensation value may be a red compensation value, the second color compensation value may be a green compensation value and the third color compensation value may be a blue compensation value. The power voltage generator may be configured to decrease the power voltage in an overcurrent mode. The power voltage generator may be configured to generate the red compensation value to maintain a red grayscale value, the green compensation value to decrease a green grayscale value and the blue compensation value to decrease a blue grayscale value in the overcurrent mode.

The first color compensation value may be a red compensation value, the second color compensation value may be a green compensation value and the third color compensation value may be a blue compensation value. The power voltage generator may be configured to decrease the power voltage in an overcurrent mode. The power voltage generator may be configured to generate the blue compensation value to maintain a blue grayscale value, the red compensation value to increase a red grayscale value and the green compensation value to increase a green grayscale value.

The driving controller may include a compensator configured to receive the overcurrent signal from the current sensor and generate the compensation value based on intermediate image data and the overcurrent signal and a data operator configured to operate the intermediate image data and the compensation value to generate the data signal and output the data signal to the data driver.

The driving controller may further include a net power controller configured to generate the intermediate image data by decreasing a grayscale value of input image data based on a load of input image data being greater than a reference load.

The net power controller may include a load calculator configured to receive the input image data and calculate the load of the input image data and a scale factor generator configured to calculate a scale factor based on the reference load and the load of the input image data and generate the intermediate image data by applying the scale factor to the input image data.

The driving controller may further include an overcurrent controller configured to receive the overcurrent signal from the current sensor and generate a power voltage control signal for decreasing the power voltage based on the overcurrent signal.

A net power control operation may be turned off in a first frame based on the load of the input image data of a previous frame of the first frame being equal to or less than the reference load, and an overcurrent mode may be turned off based on the panel current of the first frame is equal to or less than a threshold value. The net power control operation may be turned off in a second frame, which immediately follows the first frame, based on the load of the input image data of the first frame being equal to or less than the reference load, and the overcurrent mode may be immediately turned on based on the panel current of the second frame exceeding the threshold value. The net power control operation may be turned on in a third frame, which immediately follows the second frame, based on the load of the input image data of the second frame being greater than the reference load, and a turn on state of the overcurrent mode may be maintained in the third frame.

The compensation value may include a first color compensation value, a second color compensation value and a third color compensation value. The first color compensation value may be a red compensation value, the second color compensation value may be a green compensation value and the third color compensation value may be a blue compensation value. The compensator may be configured to generate the red compensation value to maintain a second frame red grayscale value, the green compensation value to decrease a second frame green grayscale value and the blue compensation value to decrease a second frame blue grayscale value in the second frame.

The green compensation value may be generated based on the second frame red grayscale value and the second frame green gray scale value in the second frame. The blue compensation value may be generated based on the second frame red gray scale value and the second frame blue grayscale value in the second frame.

Where the second frame red grayscale value is VR2, the second frame green grayscale value is VG2, the second frame blue grayscale value is VB2, a second frame compensation red grayscale value is VR2', a second frame compensation green grayscale value is VG2' and a second frame compensation blue grayscale value is VB2' and MAX is a maximum function, VR2', VG2' and VB2' may be determined as follows: VR2', VR2*(VR2/MAX(VR2,VG2,VB2)), VG2', VG2*(VG2/MAX(VR2,VG2,VB2)) and VB2', VB2*(VB2/MAX(VR2,VG2,VB2)).

The compensator may be configured to generate the blue compensation value to maintain a third frame blue grayscale value, the red compensation value to increase a third frame red grayscale value and the green compensation value to increase a third frame green grayscale value in the third frame.

The red compensation value may be generated based on a ratio of a difference between the third frame red grayscale value and the third frame blue grayscale value, and the third frame red grayscale value in the third frame. The green compensation value may be generated based on a ratio of a difference between the third frame green grayscale value and the third frame blue grayscale value, and the third frame green grayscale value in the third frame.

Where the third frame red grayscale value is VR3, the third frame green grayscale value is VG3, the third frame blue grayscale value is VB3, a third frame compensation red grayscale value is VR3', a third frame compensation green grayscale value is VG3' and a third frame compensation blue grayscale value is VB3' and MIN is a minimum function, VR3', VG3', and VB3' may be as follows: VR3'=VR3*(1+(VR3−MIN(VR3,VG3,VB3))/VR3), VG3'=VG3*(1+(VG3−MIN(VR3,VG3,VB3))/VG3), and VB3'=VB3*(1+(VB3−MIN(VR3,VG3,VB3))/VB3).

The driving controller may further include a frequency determiner configured to determine a driving frequency based on the input image data.

For a first driving frequency, the frame of the first driving frequency may include a first active period and a first vertical blank period. For a second driving frequency, the frame of the second driving frequency may include a second active period and a second vertical blank period. If the second driving frequency is less than the first driving frequency, a length of the second active period may be equal to a length of the first active period and a length of the second vertical blank period may be greater than a length of the first vertical blank period.

The compensator may be configured to generate the compensation value based on the driving frequency being less than a reference driving frequency.

In another aspect, a method of driving a display apparatus according to the present inventive concept, the method includes generating a power voltage, outputting the power voltage to a display panel, sensing a panel current of the display panel, outputting an overcurrent signal based on the panel current being greater than a threshold value, generating a compensation value based on the overcurrent signal, generating a data signal to which the compensation value is applied, generating a data voltage based on the data signal and outputting the data voltage to the display panel.

The generating of the compensation value may include receiving the overcurrent signal from a current sensor and generating the compensation value based on intermediate image data and the overcurrent signal. The generating of the data voltage may include processing the intermediate image data and the compensation value to generate the data signal.

The method may further include generating the intermediate image data by decreasing a grayscale value of input image data based on a load of the input image data being greater than a reference load.

The method may further include generating a power voltage control signal for decreasing the power voltage based on the overcurrent signal and decreasing the power voltage based on the overcurrent signal.

The method may further include determining a driving frequency based on input image data. The compensation value may be generated based on the driving frequency being less than a reference driving frequency.

According to the display apparatus and the method of driving the display apparatus, the driving controller may generate the compensation value based on the overcurrent signal of the current sensor and generate the data signal to which the compensation value is applied so that the color shift of the display image may be prevented in the overcurrent preventing mode. Thus, the display quality of the display panel may be enhanced.

The driving controller may generate the compensation value in different ways in the first compensation frame to which the net power control is not applied and in which the overcurrent occurs and the second compensation frame to which the net power control is applied and in which the overcurrent occurs. Thus, the color shift of the display image may be effectively prevented so that the display quality of the display panel may be further enhanced.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
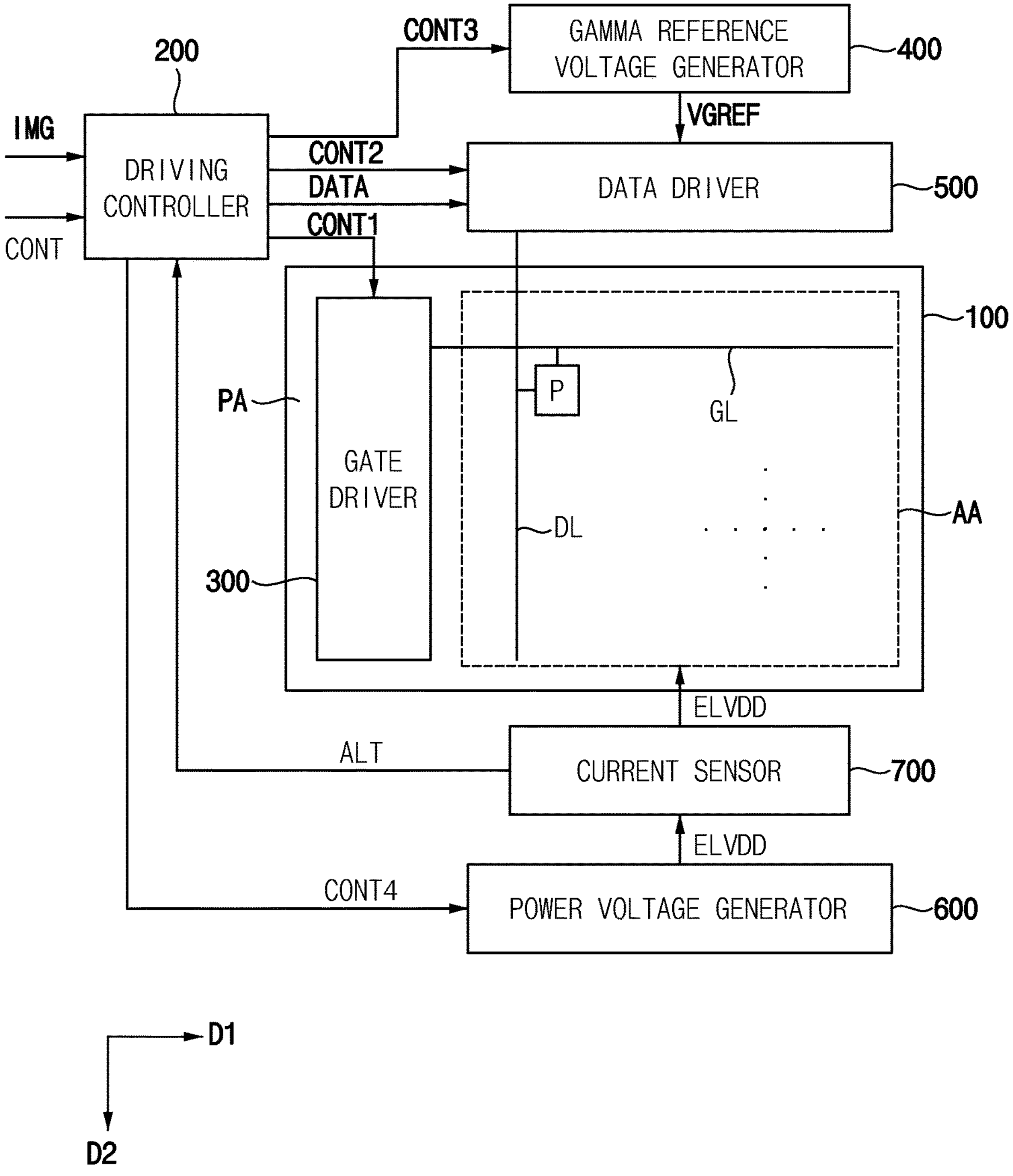
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400 and a data driver 500. The display panel driver may further include a power voltage generator 600 and a current sensor 700.

For example, the driving controller 200 and the data driver 500 may be integrally formed. For example, the driving controller 200, the gamma reference voltage generator 400 and the data driver 500 may be integrally formed. For example, the driving controller 200, the gamma reference voltage generator 400, the data driver 500, the power voltage generator 600 and the current sensor 700 may be integrally formed. A driving module including at least the driving controller 200 and the data driver 500 which are integrally formed may be called to a timing controller embedded data driver (TED).

The display panel 100 has a display region AA on which an image is displayed and a peripheral region PA adjacent to the display region AA.

For example, in the present embodiment, the display panel 100 may be an organic light emitting diode display panel including an organic light emitting diode. For example, the display panel 100 may be a quantum dot organic light emitting diode display panel including an organic light emitting diode and a quantum dot color filter. For example, the display panel 100 may be a quantum dot nano light emitting diode display panel including a nano light emitting diode and a quantum dot color filter. Alternatively, the display panel 100 may be a liquid crystal display panel including a liquid crystal layer.

The display panel 100 includes a plurality of gate lines GL, a plurality of data lines DL and a plurality of pixels P connected to the gate lines GL and the data lines DL. The gate lines GL extend in a first direction D1 and the data lines DL extend in a second direction D2 crossing the first direction D1.

In the present embodiment, the display panel driver may further include a sensing unit receiving a sensing signal from the pixels of the display panel 100. The sensing unit may be disposed in the data driver 500. When the data driver 500 is formed as a data driving integrated circuit (IC), the sensing unit may be disposed in the data driving IC.

The driving controller 200 receives input image data IMG and an input control signal CONT from an external apparatus (e.g. a host or an application processor). The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 may generate a fourth control signal CONT4 for controlling an operation of the power voltage generator 600 based on the input control signal CONT and an overcurrent signal ALT, and outputs the fourth control signal CONT4 to the power voltage generator 600. The fourth control signal CONT4 may include a power voltage control signal to decrease a power voltage.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL.

In an embodiment, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF is used to convert the data signal DATA to the data voltage having an analog type.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may generate the power voltage ELVDD and output the power voltage ELVDD to the display panel 100. The power voltage generator 600 may generate a low power voltage ELVSS and output the low power voltage ELVSS to the display panel 100. In addition, the power voltage generator 600 may generate a gate driving voltage for driving the gate driver 300 and output the gate driving voltage to the gate driver 300. In addition, the power voltage generator 600 may generate a data driving voltage for driving the data driver 500 and output the data driving voltage to the data driver 500.

The current sensor 700 may sense a panel current of the display panel 100. When the panel current is greater than a threshold value, the current sensor 700 may generate an overcurrent signal ALT. When the panel current is greater than the threshold value, the display apparatus may be damaged due to the overcurrent. Thus, when the panel current is greater than the threshold value, the current sensor 700 may generate an overcurrent signal ALT to prevent the damage of the display apparatus. The current sensor 700 may output the overcurrent signal ALT to the driving controller 200. For example, the panel current may represent an overall current level of the display panel 100.

For example, the current sensor 700 may be disposed on a path through which the power voltage generator 600 outputs the power voltage ELVDD to the display panel 100.

Figure 2:
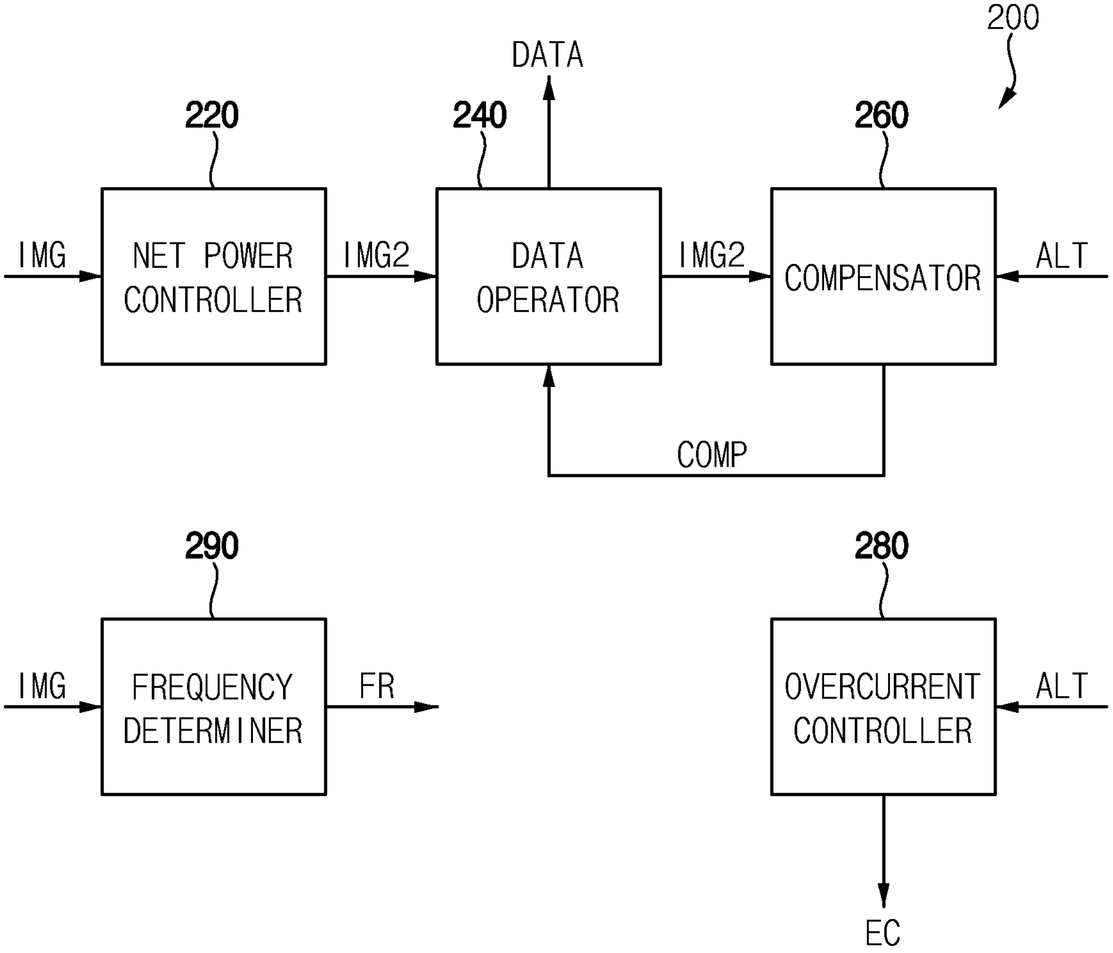
FIG. 2 is a block diagram illustrating a driving controller of FIG. 1.

FIG. 2 is a block diagram illustrating the driving controller 200 of FIG. 1.

Referring to FIGS. 1 and 2, the driving controller 200 may receive the overcurrent signal ALT from the current sensor 700. The driving controller 200 may generate a compensation value COMP based on the overcurrent signal ALT and generate a data signal DATA to which the compensation value COMP is applied. The driving controller 200 may output the data signal DATA to the data driver 500.

Herein, the compensation value COMP may include a first color compensation value, a second color compensation value and a third color compensation value. For example, the display panel 100 may include a red pixel, a green pixel and a blue pixel. The first color compensation value may be a red compensation value, the second color compensation value may be a green compensation value and the third color compensation value may be a blue compensation value.

According to an embodiment, the power voltage generator 600 may decrease the power voltage ELVDD in an overcurrent mode and the driving controller 200 may generate the red compensation value to maintain a red grayscale value, the green compensation value to decrease a green grayscale value and the blue compensation value to decrease a blue grayscale value in the overcurrent mode.

According to an embodiment, the power voltage generator 600 may decrease the power voltage ELVDD in the overcurrent mode and the driving controller 200 may generate the blue compensation value to maintain the blue grayscale value, the red compensation value to increase the red grayscale value and the green compensation value to increase the green grayscale value.

For example, the driving controller 200 may include a net power controller 220, a data operator 240, a compensator 260, an overcurrent controller 280 and a frequency determiner 290.

When a load of the input image data IMG is greater than a reference load, the net power controller 220 may generate intermediate image data IMG2 by decreasing a grayscale value of the input image data IMG. When the load of the input image data is equal to or less than the reference load, the net power controller 220 may not change the grayscale value of the input image data IMG.

The net power controller 220 may output the intermediate image data IMG2 to the data operator 240.

When the load of the input image data IMG is greater than the reference load, a net power control operation turns on. In contrast, when the load of the input image data IMG is equal to or less than the reference load, the net power control operation turns off.

The net power controller 220 may calculate the load of the input image data IMG by summing all grayscales of the input image data IMG or sampling some grayscales among all grayscales of the input image data IMG. For example, the load of the input image data IMG may be calculated in every frame.

It takes a certain amount of time for the net power controller 220 to determine the load of the input image data IMG. Hence, there may be a one-frame delay in the application of the net power control operation. For example, when a load of the input image data IMG of a first frame is greater than the reference load, the net power control operation may be turned on in a second frame.

The data operator 240 may receive the intermediate image data IMG2 from the net power controller 220. The data operator 240 may receive the compensation value COMP from the compensator 260.

The data operator 240 may operate the intermediate image data IMG2 and the compensation value COMP to generate the data signal DATA. The data operator 240 may output the data signal DATA to the data driver 500.

The compensator 260 may receive the overcurrent signal ALT from the current sensor 700 and may receive the intermediate image data IMG2 from the net power controller 220 or the data operator 240. Although the compensator 260 receives the intermediate image data IMG2 from the data operator 240 in FIG. 2, the present inventive concept may not be limited thereto.

The compensator 260 may generate the compensation value COMP based on the intermediate image data IMG2 and the overcurrent signal ALT. The compensator 260 may further receive a vertical start signal representing a start of a frame. For example, the compensator 260 may generate the compensation value COMP in synchronization with the vertical start signal. The compensator 260 may output the compensation value COMP to the data operator 240.

The overcurrent controller 280 may receive the overcurrent signal ALT from the current sensor 700. The overcurrent controller 280 may generate a power voltage control signal EC for decreasing the power voltage ELVDD based on the overcurrent signal ALT. The overcurrent controller 280 may output the power voltage control signal EC to the power voltage generator 600. As mentioned above, the power voltage control signal EC may be part of the fourth control signal CONT4.

In the overcurrent mode, the power voltage generator 600 may decrease the power voltage ELVDD to a predetermined level based on the power voltage control signal EC. When the power voltage ELVDD is decreased to the predetermined level, the overcurrent mode is turned on. When the power voltage ELVDD is not decreased to the predetermined level but have a normal level, the overcurrent mode is turned off.

The frequency determiner 290 may select and set a driving frequency FR based on the input image data IMG. For example, when the input image data IMG represents a static image, the frequency determiner 290 may set the driving frequency FR to a relatively low driving frequency. Conversely, when the input image data IMG represents a moving image, the frequency determiner 290 may set the driving frequency FR to a relatively high driving frequency. The frequency determiner 290 may adjust the driving frequency FR according to the grayscale value of the input image data IMG.

Figure 3:
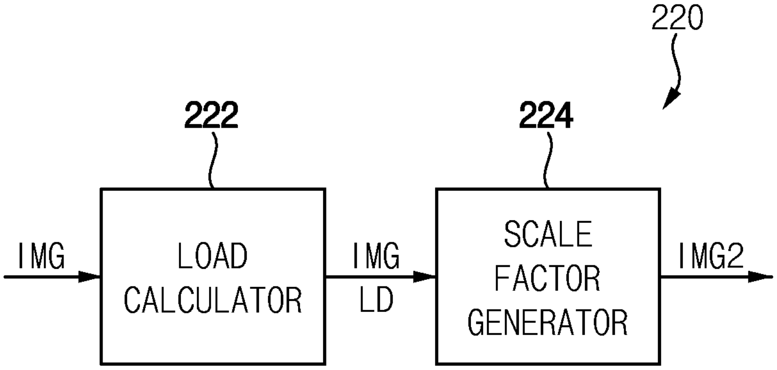
FIG. 3 is a block diagram illustrating a net power controller of FIG. 2.

FIG. 3 is a block diagram illustrating the net power controller 220 of FIG. 2.

Referring to FIGS. 1 to 3, the net power controller 220 may include a load calculator 222 and a scale factor generator 224.

The load calculator 222 may receive the input image data IMG. The load calculator 222 may calculate the load LD of the input image data IMG based on the grayscale value of the input image data IMG. The load calculator 222 may calculate the load LD of the input image data IMG in every frame.

The scale factor generator 224 may receive the input image data IMG and the load LD. The scale factor generator 224 may calculate a scale factor based on the reference load and the load of the input image data IMG. The scale factor generator 224 may generate the intermediate image data IMG2 by applying the scale factor to the input image data IMG. For example, the scale factor may be equal to or greater than 0 and equal to or less than 1. When the scale factor is 0.5, the intermediate image data IMG2 having the grayscale value of the input image data IMG which is reduced by half or a pixel code value which is reduced by half may be generated.

As explained above, it takes a certain amount of time for the net power controller 220 to determine the load LD of the input image data IMG. Hence, one-frame delay may be applied to the net power control operation.

Figure 4:
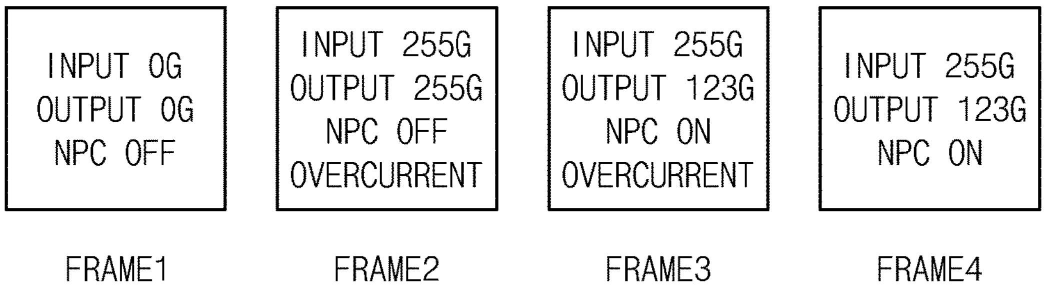
FIG. 4 is a conceptual diagram illustrating a driving timing of the display apparatus of FIG. 1.
Figure 5:
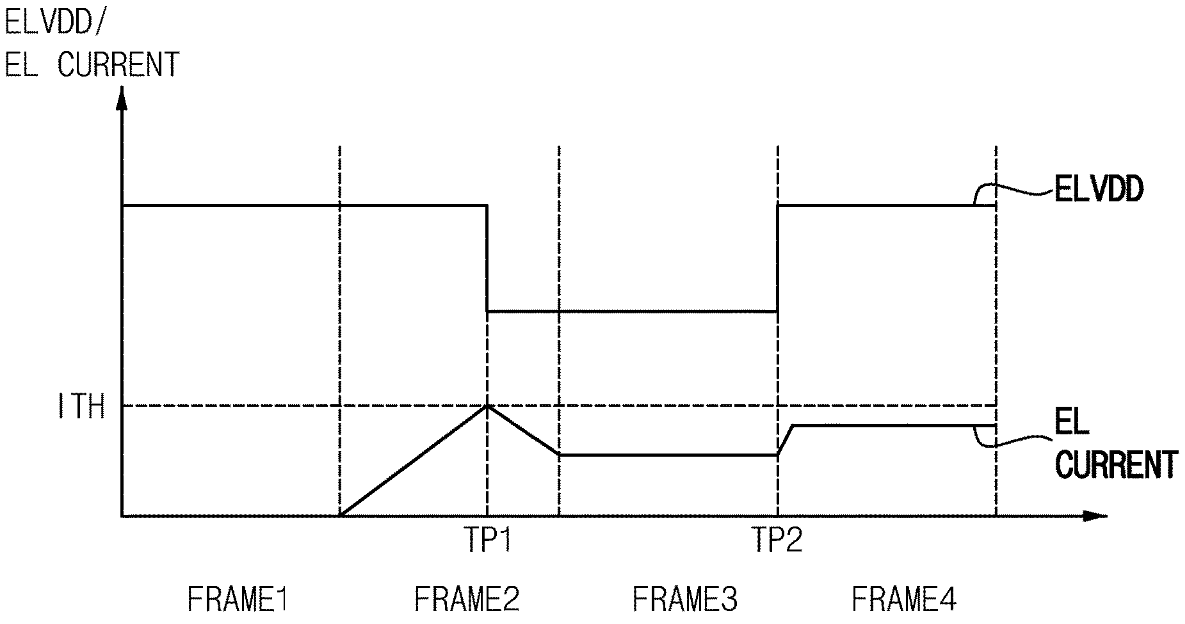
FIG. 5 is a graph illustrating a power voltage and a panel current of a display panel in the driving timing of FIG. 4.

FIG. 4 is a conceptual diagram illustrating a driving timing of the display apparatus of FIG. 1. FIG. 5 is a graph illustrating the power voltage ELVDD and the panel current (EL current) of the display panel 100 in the driving timing of FIG. 4.

For example, in FIGS. 4 and 5, input image data IMG of a first frame FRAME1 represent a grayscale value of 0 (INPUT 0G), and input image data IMG of a second frame FRAME2, a third frame FRAME3 and a fourth frame FRAME4 represent a grayscale value of 255 (INPUT 255G). Herein, the grayscale value of 0 (0G) may represent a black image and the grayscale value of 255 (255G) may represent a full white image.

In the first frame FRAME1, the input image data IMG has a first grayscale value (e.g. the grayscale value of 0 (INPUT 0G)). Under these conditions, both the net power control operation and the overcurrent mode may be turned off (shown as NPC OFF and no OVERCURRENT).

Whether the net power control operation of the first frame FRAME1 is performed or not may depend on the load LD of the input image data IMG of a previous frame. FIG. 4 depicts a situation where the load LD of the input image data IMG of the previous frame (not shown) is equal to or less than the reference load. If the load LD of the input image data IMG of the previous frame is equal to or less than the reference load, the net power control operation may not be performed in the first frame FRAME1.

The overcurrent mode may be immediately applied when the panel current exceeds the threshold value ITH. When the display panel 100 displays the black image in the first frame FRAME1, the level of the panel current of the first frame FRAME1 is equal to or less than the threshold value ITH. When the panel current is equal to or less than the threshold value ITH, the overcurrent mode may be turned off.

In the second frame FRAME2 which is the frame immediately following the first frame FRAME1, the input image data IMG has a second grayscale value (e.g. the grayscale value of 255 (INPUT 255G)) greater than the first grayscale value (e.g. the grayscale value of (INPUT 0G)), the net power control operation may be turned off (NPC OFF) and the overcurrent mode (OVERCURRENT) may be turned on.

Whether the net power control operation of the second frame FRAME2 is performed or not may depend on the load LD of the input image data IMG of the first frame FRAME1 which immediately preceded the second frame FRAME2. The input image data IMG of the first frame FRAME1 represent the grayscale value of 0 and accordingly the load LD of the input image data IMG of the preceding frame is equal to or less than the reference load. Under these conditions, the net power control operation may not be performed in the second frame FRAME2.

The overcurrent mode may be immediately applied when the panel current exceeds the threshold value ITH. When the display panel 100 displays the full white image in the second frame FRAME2, the level of the panel current is gradually increased in the second frame FRAME2. When the level of the panel current of the second frame FRAME2 exceeds the threshold value ITH at a specific point in time TP1 in the second frame FRAME2, the overcurrent mode may be turned on (indicated by OVERCURRENT in FIG. 4).

When the overcurrent mode is turned on, the current sensor 700 may output the overcurrent signal ALT to the driving controller 200 and the driving controller 200 may output the power voltage control signal EC for decreasing the power voltage ELVDD to the power voltage generator 600. The power voltage generator 600 may decrease the power voltage ELVDD to a predetermined level in response to the power voltage control signal EC and output the modified power voltage ELVDD to the display panel 100.

As shown in FIG. 5, when the overcurrent mode is turned on and the level of the power voltage ELVDD decreases (at TP1), the panel current gradually decreases.

The overcurrent mode is immediately triggered by the panel current exceeding the threshold ITH, whereas an exit from the overcurrent mode may be synchronized to a start time of the frame by the vertical start signal. In addition, for stable operation of the overcurrent mode, the overcurrent mode may be maintained for at least one frame. Thus, the overcurrent mode may be maintained in the frame FRAME3 immediately following the frame FRAME2 within which the overcurrent mode started. At the beginning of a next frame FRAME4, which happens when the panel current is stabilized in FRAME3, the overcurrent mode turns off.

In the third frame FRAME3 which immediately follows the second frame FRAME2, the input image data IMG has the second grayscale value (e.g. the grayscale value of 255 (INPUT 255G)), the net power control operation may be turned on (NPC ON) and the overcurrent mode (OVERCURRENT) may be turned on.

Whether the net power control operation of the third frame FRAME3 is performed or not depends on the load LD of the input image data IMG of the second frame FRAME2, which is the frame immediately preceding the third frame FRAME3. The input image data IMG of the second frame FRAME2 represent the grayscale value of 255 and accordingly the load LD of the input image data IMG of the previous frame is greater than the reference load so that the net power control operation may be performed in the third frame FRAME3. Due to the net power control operation in the third frame FRAME3, an input grayscale value of the third frame FRAME3 is the grayscale value of 255 (INPUT 255G) and an output grayscale value of the third frame FRAME3 is a grayscale value of 123 (OUTPUT 123G). As explained above, a turned-on state of the overcurrent mode OVERCURRENT may be maintained in the third frame FRAME3.

In the fourth frame FRAME4, which is the frame immediately following the third frame FRAME3, the input image data IMG has the second grayscale value (e.g. the grayscale value of 255 (INPUT 255G)), causing the net power control operation to be turned on (NPC ON), and the overcurrent mode may be turned off. A reason the net power control operation is turned on in the fourth frame FRAME4 is the same as the reason the net power control operation is turned on in the third frame FRAME3. In addition, at the start time TP2 of the fourth frame FRAME4, the panel current has a low level due to a decrease of the power voltage ELVDD so that the overcurrent mode may be turned off at the starting point in time TP2 of the fourth frame FRAME4. The input grayscale value in the second frame FRAME2 is same as the input grayscale value in the fourth frame FRAME4 but the net power control operation is turned on (NPC ON) in the fourth frame FRAME4 unlike the second frame FRAME2 so that the output grayscale value of the fourth frame FRAME4 is the grayscale value of 123 (OUTPUT 123G). Accordingly, the panel current may not rise to the threshold value ITH.

In the second frame FRAME2 and the third frame FRAME3, the luminance may decrease due to the decrease of the power voltage ELVDD. A color shift may occur with the decrease in luminance. For example, a cyanish tendency representing a relatively cyan hue in the displayed image may occur in the second frame FRAME2 and the third frame FRAME3.

Figure 6A:
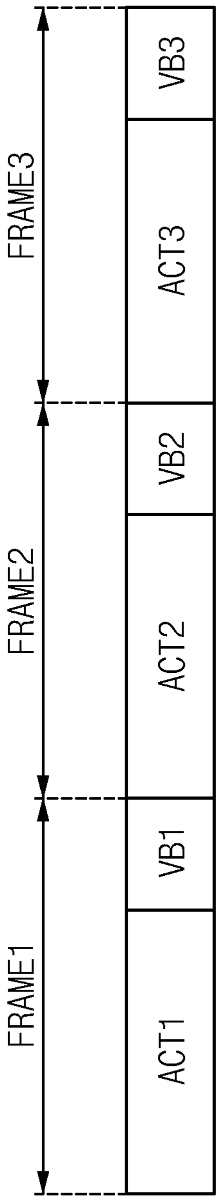
FIG. 6A is a conceptual diagram illustrating an example of an operation of a frequency determiner of FIG. 2.
Figure 6B:
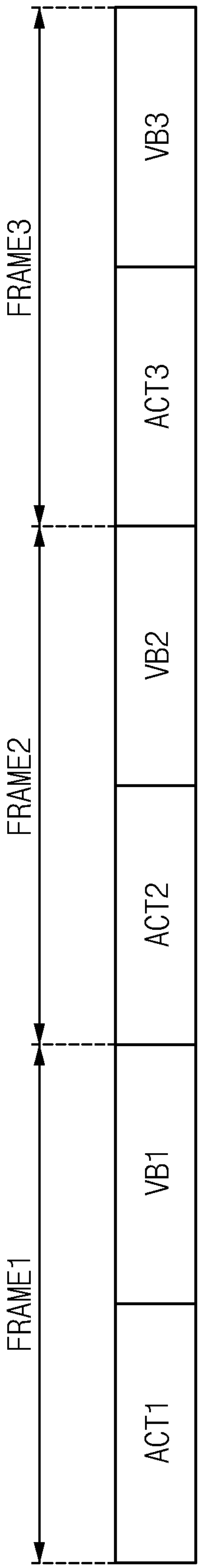
FIG. 6B is a conceptual diagram illustrating an example of an operation of the frequency determiner of FIG. 2.
Figure 6C:
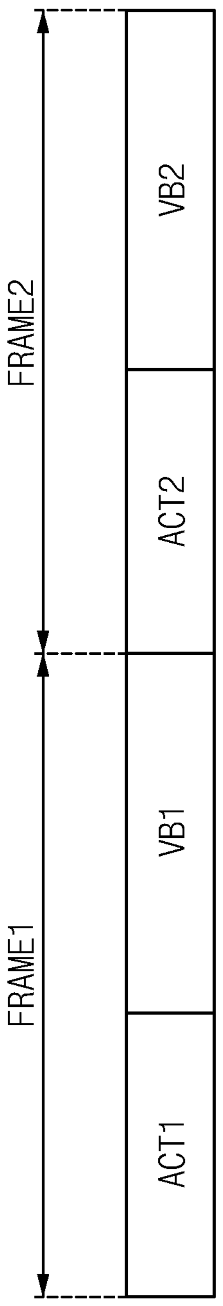
FIG. 6C is a conceptual diagram illustrating an example of an operation of the frequency determiner of FIG. 2.

FIG. 6A is a conceptual diagram illustrating an example of an operation of the frequency determiner 290 of FIG. 2. FIG. 6B is a conceptual diagram illustrating an example of an operation of the frequency determiner 290 of FIG. 2. FIG. 6C is a conceptual diagram illustrating an example of an operation of the frequency determiner 290 of FIG. 2.

Referring to FIGS. 1 to 6C, the display panel 100 is driven in a unit of a frame and the frame may include an active period and a vertical blank period.

When the driving frequency FR determined by the frequency determiner 290 is a first driving frequency, a frame in the first driving frequency may include a first active period (ACT1, ACT2 and ACT3 of FIG. 6A) and a first vertical blank period (VB1, VB2 and VB3 of FIG. 6A). The lengths of ACT1, ACT2, and ACT3 may be substantially the same.

When the driving frequency FR determined by the frequency determiner 290 is a second driving frequency, a frame in the second driving frequency may include a second active period (ACT1, ACT2 and ACT3 of FIG. 6B) and a second vertical blank period (VB1, VB2 and VB3 of FIG. 6B).

When the driving frequency FR determined by the frequency determiner 290 is a third driving frequency, a frame in the third driving frequency may include a third active period (ACT1 and ACT2 of FIG. 6C) and a third vertical blank period (VB1 and VB2 of FIG. 6C).

As the driving frequency FR changes, a length of the active period ACT1, ACT2 and ACT3 may remain constant while a length of the vertical blank period VB1, VB2 and VB3 may vary as shown in FIGS. 6A to 6C. As the driving frequency FR decreases, the length of the vertical blank period VB1, VB2 and VB3 may increase.

In the second frame FRAME2 and the third frame FRAME3, the luminance may decrease due to the decrease of the power voltage ELVDD so that the color shift may occur with the decrease of the luminance. When the driving frequency FR is low, the length of the frame becomes longer. Thus, the luminance decrease and the color shift may be more strongly recognized by the user when low driving frequency FR is used.

Accordingly, the compensator 260 may operate to generate the compensation value COMP only when the driving frequency FR is less than a reference driving frequency.

Figure 7:
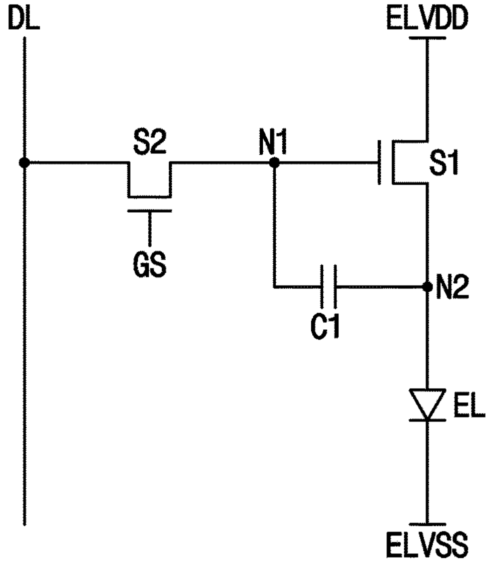
FIG. 7 is a circuit diagram illustrating a pixel of the display panel of FIG. 1.
Figure 8:
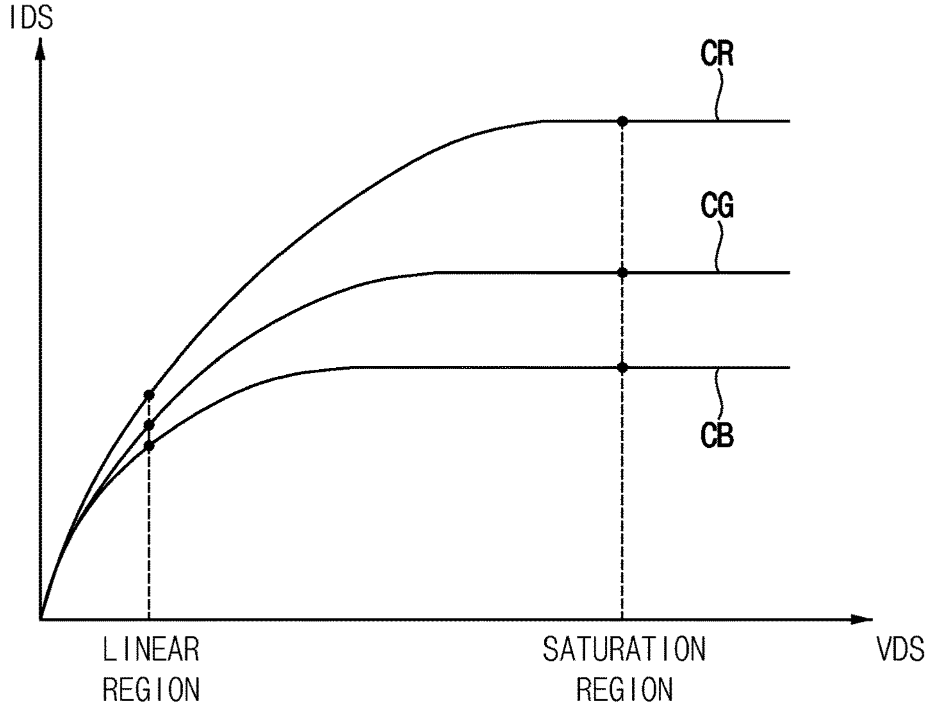
FIG. 8 is a graph illustrating a current-voltage curve according to a color of the pixel of FIG. 7.
Figure 9:
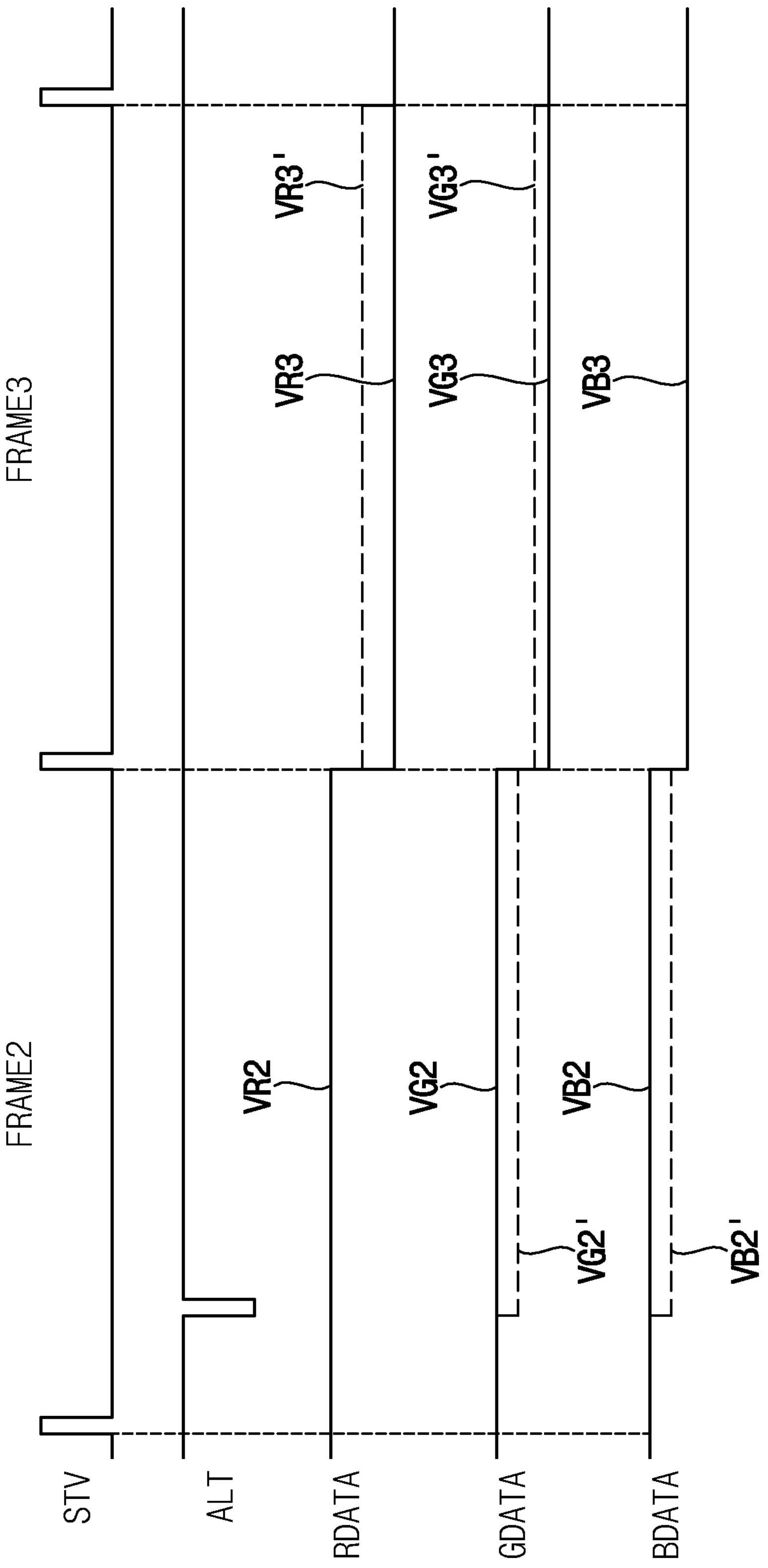
FIG. 9 is a conceptual diagram illustrating a compensation value generated by a compensator of FIG. 2.

FIG. 7 is a circuit diagram illustrating a pixel of the display panel 100 of FIG. 1. FIG. 8 is a graph illustrating a current-voltage curve according to a color of the pixel of FIG. 7. FIG. 9 is a conceptual diagram illustrating the compensation value COMP generated by the compensator 260 of FIG. 2.

Referring to FIGS. 1 to 9, the pixel may include a first switching element S1, a second switching element S2, a first capacitor C1 and a light emitting element EL. A gate signal GS is applied to a control electrode of the second switching element S2. The current-voltage curve of FIG. 8 may be defined according to a voltage VGS between a gate electrode N1 and a source electrode N2 of the first switching element S1.

In FIG. 8, CR is a current-voltage curve of a red pixel, CG is a current-voltage curve of a green pixel and CB is a current-voltage curve of a blue pixel. In FIG. 8, VDS represents a voltage between a drain electrode (an ELVDD terminal) and the source electrode N2 and IDS represents a current flowing through the drain electrode (an ELVDD terminal) and the source electrode N2.

In order to achieve white balance (which makes signal/gray scale that represents "white" actually appear white), VGS of the red pixel may be greater than VGS of the green pixel and VGS of the green pixel may be greater than VGS of the blue pixel. Accordingly, the red pixel, the green pixel and the blue pixel may achieve the white balance in a saturation region.

When the power voltage ELVDD is decreased in the overcurrent mode, the current-voltage curve may move from the saturation region to a linear region and in this situation, a color shift may occur and the white balance may be broken.

For example, as the degree of luminance increase in the red pixel is less than the degree of luminance increase in the green pixel and the blue pixel in the linear region, the display image may take on a cyanish hue.

As shown in FIG. 9, in the second frame FRAME2 when the net power control operation is turned off (NPC OFF) and the overcurrent mode is turned on (OVERCURRENT), the display image may look cyanish. Thus, the compensator 260 may generate the red compensation value for maintaining a second frame red grayscale value, the green compensation value for decreasing a second frame green grayscale value and the blue compensation value for decreasing a second frame blue grayscale value. In the example herein, the second frame FRAME2 may be the frame in which the overcurrent mode is turned on, referred to as the "overcurrent occurrence frame."

The grayscale value may be a pixel code value or a data voltage linearly proportional to the pixel code value. For example, the pixel code value may be a 13-bit code, and may have one of 8192 values between 0 and 8191. When the pixel code value is zero, the data voltage may have the minimum value. When the pixel code value is 8191, the data voltage may have the maximum value. A pixel code value of a red pixel, a pixel code value of a green pixel and a pixel code value of a blue pixel may be different from one another for the same grayscale value. Since a current contribution ratio of each pixel or a luminous efficiency of each pixel varies according to color, the pixel code value of the red pixel, the pixel code value of the green pixel and the pixel code value of the blue pixel may be different from one another for the same grayscale value. For example, the pixel code value of the red pixel may be greater than the pixel code value of the green pixel and the pixel code value of the blue pixel. For example, the pixel code value of the blue pixel may be less than the pixel code value of the red pixel and the pixel code value of the green pixel.

The display image may look cyanish in the second frame FRAME2. In the second frame FRAME2, the red grayscale value may be maintained, and the green grayscale value and the blue grayscale value may be decreased. In the second frame FRAME2, the net power control operation is turned off (NPC OFF) and the overcurrent mode is turned on (OVERCURRENT), so that the cyanish hue may not be eliminated by increasing the red grayscale value but by decreasing the green grayscale value and the blue grayscale value.

For example, when the second frame red grayscale value is VR2, the second frame green grayscale value is VG2, the second frame blue grayscale value is VB2, a second frame compensation red grayscale value is VR2', a second frame compensation green grayscale value is VG2' and a second frame compensation blue grayscale value is VB2' and MAX is a maximum function, VR2', VR2*(VR2/MAX(VR2,VG2, VB2)), VG2'=VG2*(VG2/MAX(VR2,VG2,VB2)) and VB2', VB2*(VB2/MAX(VR2,VG2,VB2)) may be satisfied.

Herein, the second frame red grayscale value VR2, the second frame green grayscale value is VG2, the second frame blue grayscale value VB2, the second frame compensation red grayscale value VR2', the second frame compensation green grayscale value VG2' and the second frame compensation blue grayscale value VB2' may mean the pixel code values or the data voltages. The pixel code value may be linearly proportional to the data voltage. The above equations may be applied to the data voltages linearly proportional to the pixel code values as well as the pixel code values.

When the maximum value among the second frame red grayscale value VR2, the second frame green grayscale value VG2 and the second frame blue grayscale value VB2 in the second frame FRAME2 is the second frame red grayscale value VR2, the second frame compensation green grayscale value VG2' may be generated based on a ratio of the second frame red grayscale value VR2 and the second frame green grayscale value VG2.

The second frame compensation green grayscale value VG2' may be generated by multiplying the second frame green grayscale value VG2 by the ratio of the second frame green grayscale value VG2 and the second frame red grayscale value VR2.

When the maximum value among the second frame red grayscale value VR2, the second frame green grayscale value VG2 and the second frame blue grayscale value VB2 in the second frame FRAME2 is the second frame red grayscale value VR2, the second frame compensation blue grayscale value VB2' may be generated based on a ratio of the second frame red grayscale value VR2 and the second frame blue grayscale value VB2.

The second frame compensation blue grayscale value VB2' may be generated by multiplying the second frame blue grayscale value VB2 by the ratio of the second frame blue grayscale value VB2 and the second frame red grayscale value VR2.

For example, a red input grayscale value, a green input grayscale value and a blue input grayscale value of the second frame FRAME2 may be respectively 255, 255 and 255 and a red output grayscale value, a green output grayscale value and a blue output grayscale value of the second frame FRAME2 may be respectively 255, 255 and 255. For example, to represent the grayscale value of 255, the second frame red grayscale value VR2, the second frame green grayscale value VG2 and the second frame blue grayscale value VB2 may respectively have 8000, 7000 and 6000. Herein, 8000, 7000 and 6000 may be the pixel code values. For example, the second frame red grayscale value VR2, the second frame green grayscale value VG2 and the second frame blue grayscale value VB2 may be the data voltages linearly proportional to the pixel code values 8000, 7000 and 6000. As shown in the graphs CR, CG, and CB of FIG. 8, the red grayscale value, the green grayscale value and the blue grayscale value for representing the same grayscale (e.g. the grayscale value of 255) are different from each other. For example, the red grayscale value may be greater than the green grayscale value and the green grayscale value may be greater than the blue grayscale value.

When VR2, VG2 and VB2 are respectively 8000, 7000 and 6000, MAX(VR2, VG2, VB2) is 8000 so that VR2'=8000*(8000/8000)=8000, VG2'=7000*(7000/8000)=6125, and VB2'=6000*(6000/8000)=4500 may be satisfied. Herein, the red compensation value is zero, the green compensation value is −875 (obtained by the difference VG2'−VG2) and the blue compensation value is −1500 (obtained by the difference VB2'−VB2).

As shown in FIG. 9, in the third frame FRAME3 when the net power control operation is turned on (NPC ON) and the overcurrent mode is turned on (OVERCURRENT), the display image may take on a cyanish hue. Thus, the compensator 260 may generate the blue compensation value for maintaining a third frame blue grayscale value, the red compensation value for increasing a third frame red grayscale value and the green compensation value for increasing a third frame green grayscale value. Herein, the third frame FRAME3 may be the frame immediately following the overcurrent mode occurrence frame (e.g. the second frame FRAME2).

Herein, the grayscale value may be a pixel code value or a data voltage linearly proportional to the pixel code value. For example, the pixel code value may be a 13-bit code, and may have one of 8192 values between 0 and 8191. When the pixel code value is zero, the data voltage may have the minimum value. When the pixel code value is 8191, the data voltage may have the maximum value.

The display image may look cyanish in the third frame FRAME3. In the third frame FRAME3, the blue grayscale value may be maintained, and the red grayscale value and the green grayscale value may be increased. In the third frame FRAME3, the net power control operation is turned on (NPC ON) and the overcurrent mode is turned on (OVERCURRENT), so that the cyanish hue may be reduced or eliminated by increasing the red grayscale value and the green grayscale value.

For example, when the third frame red grayscale value is VR3, the third frame green grayscale value is VG3, the third frame blue grayscale value is VB3, a third frame compensation red grayscale value is VR3', a third frame compensation green grayscale value is VG3' and a third frame compensation blue grayscale value is VB3' and MIN is a minimum function, the third compensation grayscale values may be determined as: VR3'=VR3*(1+(VR3−MIN(VR3, VG3,VB3))/VR3), VG3'=VG3*(1+(VG3−MIN(VR3,VG3, VB3))/VG3), and VB3'=VB3*(1+(VB3−MIN(VR3,VG3, VB3))/VB3).

Herein, the third frame red grayscale value VR3, the third frame green grayscale value VG3, the third frame blue grayscale value VB3, the third frame compensation red grayscale value VR3', the third frame compensation green grayscale value VG3' and the third frame compensation blue grayscale value VB3' may indicate the pixel code values or the data voltages. The pixel code value may be linearly proportional to the data voltage. The above equations may be applied to the data voltages linearly proportional to the pixel code values as well as the pixel code values.

When the minimum value among the third frame red grayscale value VR3, the third frame green grayscale value VG3 and the third frame blue grayscale value VB3 in the third frame FRAME3 is the third frame blue grayscale value VB3, the third frame compensation red grayscale value VR3' may be generated based on a ratio of a difference between the third frame red grayscale value VR3 and the third frame blue grayscale value VB3, and the third frame red grayscale value VR3.

When the minimum value among the third frame red grayscale value VR3, the third frame green grayscale value VG3 and the third frame blue grayscale value VB3 in the third frame FRAME3 is the third frame blue grayscale value VB3, the third frame compensation green grayscale value VG3' may be generated based on a ratio of a difference between the third frame green grayscale value VG3 and the third frame blue grayscale value VB3, and the third frame green grayscale value VG3.

For example, a red input grayscale value, a green input grayscale value and a blue input grayscale value of the third frame FRAME3 may be respectively 255, 255 and 255 and a red output grayscale value, a green output grayscale value and a blue output grayscale value of the third frame FRAME3 may be respectively 128, 128 and 128. Although FIG. 4 depicts a case in which the red, green, and blue output grayscale values are converted to the grayscale value of 123 by the net power control operation (NPC ON), a case in which the red, green, and blue output grayscale values are converted to 128 to the grayscale value of 123 by the net power control operation (NPC ON) is used as an example herein for convenience of explanation.

For example, to represent the grayscale value of 128, the third frame red grayscale value VR3, the third frame green grayscale value VG3 and the third frame blue grayscale value VB3 may respectively have pixel code values of 4000, 3500 and 3000. For example, the third frame red grayscale value VR3, the third frame green grayscale value VG3 and the third frame blue grayscale value VB3 may be data voltages linearly proportional to the pixel code values 4000, 3500 and 3000. As shown in the graphs CR, CG, and CB of FIG. 8, the red grayscale value, the green grayscale value and the blue grayscale value for representing the same grayscale (e.g. the grayscale value of 255) are different from each other. For example, the red grayscale value may be greater than the green grayscale value and the green grayscale value may be greater than the blue grayscale value.

When pixel code values of VR3, VG3 and VB3 are respectively 4000, 3500 and 3000, MIN(VR3, VG3, VB3) is 3000 so that VR3'=4000*(1+(4000-3000)/4000)=5000, VG3'=3500*(1+(3500−3000)/3500)=4000, and VB3'=3000*(1+(3000−3000)/3000)=3000 may be satisfied. Herein, the red compensation value is +1000, the green compensation value is +500 and the blue compensation value is zero.

According to the present embodiment, the driving controller 200 may generate the compensation value COMP based on the overcurrent signal ALT of the current sensor 700 and generate the data signal DATA to which the compensation value COMP is applied so that the color shift of the display image may be prevented in the overcurrent preventing mode. Thus, the display quality of the display panel 100 may be enhanced.

The driving controller 200 may generate the compensation value COMP in different ways in the first compensation frame (e.g. FRAME2) to which the net power control is not applied and in which the overcurrent occurs partway through the frame and the second compensation frame (e.g. FRAME3) to which the net power control is applied and overcurrent occurs for the entire frame. With the compensation value generation method described herein, the color shift of the display image may be effectively reduced or prevented so that the display quality of the display panel 100 may be further enhanced.

Figure 10:
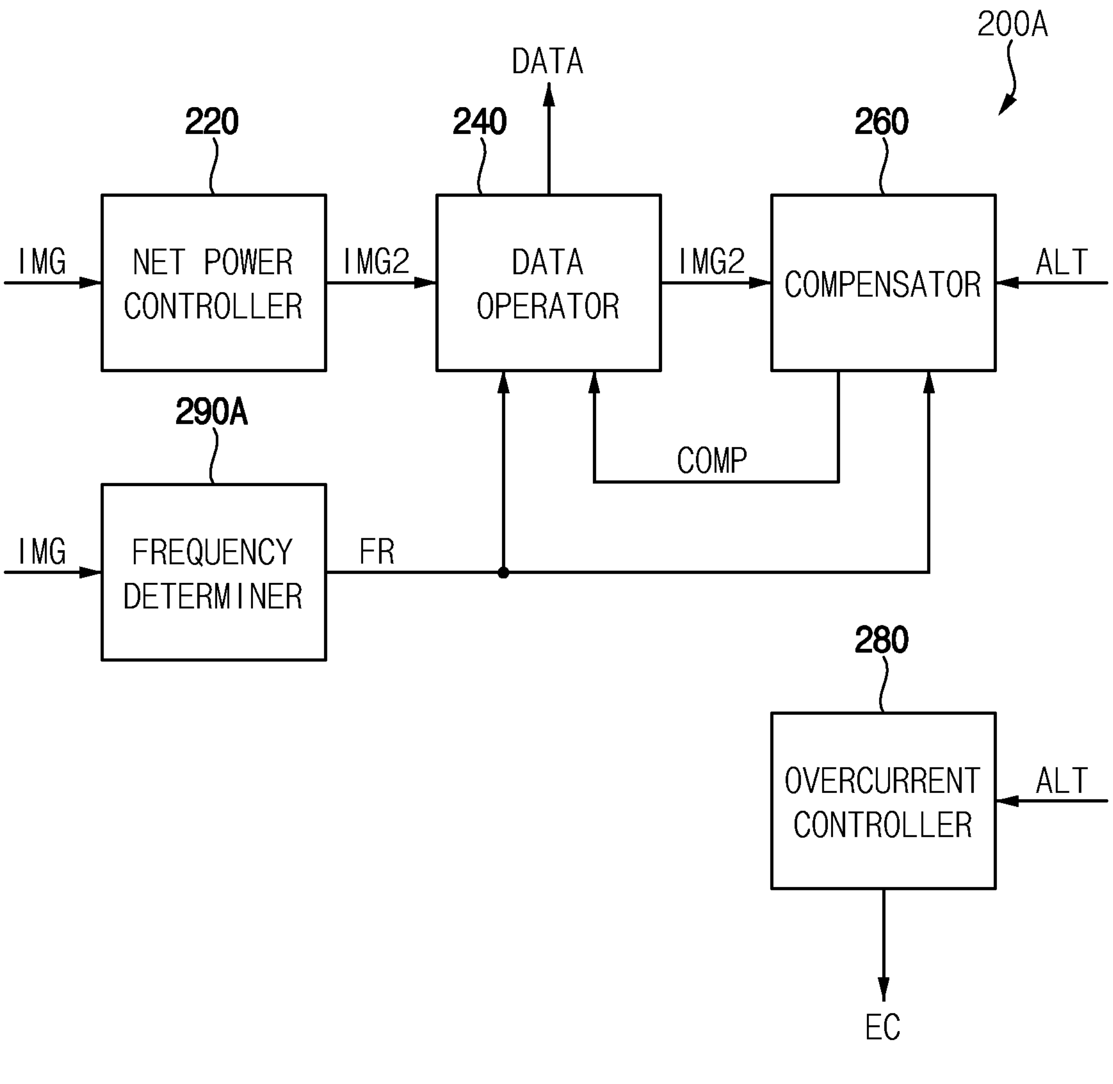
FIG. 10 is a block diagram illustrating a driving controller of a display apparatus according to an embodiment of the present inventive concept.

FIG. 10 is a block diagram illustrating a driving controller 200A of a display apparatus according to an embodiment of the present inventive concept.

The display apparatus according to the present embodiment is substantially the same as the display apparatus of the previous embodiment explained referring to FIGS. 1 to 9 except for the operation of the driving controller. Thus, the same reference numerals will be used to refer to the same or like parts as those described in the previous embodiment of FIGS. 1 to 9 and any repetitive explanation concerning the above elements will be omitted.

Referring to FIGS. 1 and 3 to 10, the driving controller 200A may receive the overcurrent signal ALT from the current sensor 700. The driving controller 200A may generate a compensation value COMP based on the overcurrent signal ALT and generate a data signal DATA to which the compensation value COMP is applied. The driving controller 200A may output the data signal DATA to the data driver 500.

For example, the driving controller 200A may include a net power controller 220, a data operator 240, a compensator 260, an overcurrent controller 280 and a frequency determiner 290A.

In the present embodiment, the frequency determiner 290A may determine a driving frequency FR based on the input image data IMG. For example, when the input image data IMG represents a static image, the frequency determiner 290A may determine the driving frequency FR to a relatively low driving frequency. For example, when the input image data IMG represents a moving image, the frequency determiner 290A may determine the driving frequency FR to a relatively high driving frequency. For example, the frequency determiner 290A may adjust the driving frequency FR according to the grayscale value of the input image data IMG.

In the present embodiment, the frequency determiner 290A may output the driving frequency FR to the data operator 240. The data operator 240 may receive and process the intermediate image data IMG2 and the compensation value COMP to generate the data signal DATA having the driving frequency FR. The data operator 240 may output the data signal DATA to the data driver 500.

When the driving frequency FR changes, a length of the active period ACT1, ACT2 and ACT3 may remain constant and a length of the vertical blank period VB1, VB2 and VB3 by the frequency determiner 290A may vary as shown in FIGS. 6A to 6C. As the driving frequency FR decreases, the length of the vertical blank period VB1, VB2 and VB3 may increase.

In the second frame FRAME2 and the third frame FRAME3, the luminance may decrease due to the decrease of the power voltage ELVDD so that the color shift may occur with the decrease of the luminance. When the driving frequency FR is low, the length of the frame becomes longer. Thus, the luminance decrease and the color shift may be more strongly recognized by the user in the low driving frequency FR.

In the present embodiment, the frequency determiner 290A may output the driving frequency FR to the compensator 260. The compensator 260 may operate to generate the compensation value COMP only when the driving frequency FR received from the frequency determiner 290A is less than a reference driving frequency.

As shown in FIG. 9, in the second frame FRAME2 when the net power control operation is turned off (NPC OFF) and the overcurrent mode is turned on (OVERCURRENT), the display image may look cyanish. To reduce the cyanish hue, the compensator 260 may generate the red compensation value for maintaining a second frame red grayscale value, the green compensation value for decreasing a second frame green grayscale value and the blue compensation value for decreasing a second frame blue grayscale value. Herein, the second frame FRAME2 may be an overcurrent mode occurrence frame.

As shown in FIG. 9, in the third frame FRAME3 when the net power control operation is turned on (NPC ON) and the overcurrent mode is turned on (OVERCURRENT), the display image may look cyanish. To reduce the cyanish hue, the compensator 260 may generate the blue compensation value for maintaining a third frame blue grayscale value, the red compensation value for increasing a third frame red grayscale value and the green compensation value for increasing a third frame green grayscale value. Herein, the third frame FRAME3 may be the frame that immediately follows the overcurrent mode occurrence frame (which, in the context of the example in this disclosure, is the second frame FRAME2). According to the present embodiment, the driving controller 200A may generate the compensation value COMP based on the overcurrent signal ALT of the current sensor 700 and generate the data signal DATA to which the compensation value COMP is applied so that any noticeable color shift of the display image may be avoided in the overcurrent preventing mode. Thus, the display quality of the display panel 100 may be enhanced.

The driving controller 200A may generate the compensation value COMP in different ways in the first compensation frame (e.g. FRAME2) to which the net power control is not applied and in which the overcurrent occurs partway through the frame, and the second compensation frame (e.g. FRAME3) to which the net power control is applied and in which the overcurrent occurs for the entire frame. Thus, the color shift of the display image may be effectively avoided and the display quality of the display panel 100 may be further enhanced.

According to the embodiments of the display apparatus, the display quality of the display panel may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:

a display panel;

a power voltage generator configured to generate a power voltage and output the power voltage to the display panel;

a current sensor configured to sense a panel current of the display panel and output an overcurrent signal when the panel current is greater than a threshold value;

a driving controller configured to generate a compensation value in response to the overcurrent signal and generate a data signal that is processed with the compensation value; and a data driver configured to generate a data voltage based on the data signal and output the data voltage to the display panel, wherein an overcurrent mode is turned on immediately after the panel current exceeds the threshold value, and the overcurrent mode is maintained for at least one frame, wherein the driving controller further comprises a net power controller configured to generate intermediate image data output to a data operator of the driving controller that generates the data signal based on the intermediate image data and the compensation value by decreasing a grayscale value of input image data when a load of the input image data is greater than a reference load, wherein a net power control operation is turned off in a first frame based on a load of the input image data of a previous frame that immediately preceded the first frame being equal to or less than the reference load, and the overcurrent mode is turned off based on the panel current of the first frame being equal to or less than the threshold value, wherein the net power control operation is turned off in a second frame which immediately follows the first frame based on the load of the input image data of the first frame being equal to or less than the reference load, and the overcurrent mode is immediately turned on based on the panel current of the second frame exceeding the threshold value, and wherein the net power control operation is turned on in a third frame which immediately follows the second frame based on the load of the input image data of the second frame being equal to or greater than the reference load, and a turn on state of the overcurrent mode is maintained in the third frame.

2. The display apparatus of claim 1, wherein the compensation value includes a first color compensation value, a second color compensation value and a third color compensation value.

3. The display apparatus of claim 2, wherein the first color compensation value is a red compensation value, the second color compensation value is a green compensation value and the third color compensation value is a blue compensation value, wherein the power voltage generator is configured to decrease the power voltage in the overcurrent mode, and wherein the driving controller is configured to generate the red compensation value to maintain a red grayscale value, the green compensation value to decrease a green grayscale value and the blue compensation value to decrease a blue grayscale value in the overcurrent mode.

4. The display apparatus of claim 2, wherein the first color compensation value is a red compensation value, the second color compensation value is a green compensation value and the third color compensation value is a blue compensation value, wherein the power voltage generator is configured to decrease the power voltage in the overcurrent mode, and wherein the driving controller is configured to generate the blue compensation value to maintain a blue grayscale value, the red compensation value to increase a red grayscale value and the green compensation value to increase a green grayscale value.

5. The display apparatus of claim 1, wherein the driving controller comprises a compensator connected to a first signal line which transmits the overcurrent signal from the current sensor to the driving controller, the compensator of the driving controller generating the compensation value based on the intermediate image data and the overcurrent signal, wherein the data operator is connected to a second signal line which transmits the compensation value from the compensator and connected to the data driver and outputs the data signal to the data driver.

6. The display apparatus of claim 5, wherein the net power controller comprises:

a load calculator connected to a third signal line which transmits the input image data from an external apparatus to the driving controller, the load calculator receiving the input image data and calculating the load of the input image data; and a scale factor generator connected to a fourth signal line which transmits the load of the input image data from the load calculator and connected to the data operator, the scale factor generator calculating a scale factor based on the reference load and the load of the input image data, generating the intermediate image data by applying the scale factor to the input image data, and outputting the intermediate image data to the data operator.

7. The display apparatus of claim 5, wherein the driving controller further comprises an overcurrent controller configured to receive the overcurrent signal from the current sensor and generate a power voltage control signal for decreasing the power voltage in response to the overcurrent signal.

8. The display apparatus of claim 5, wherein the driving controller further comprises a frequency determiner configured to determine a driving frequency based on the input image data.

9. The display apparatus of claim 8, wherein the display panel is driven in a unit of a frame, wherein the frame includes an active period and a vertical blank period, wherein a first frame includes a first active period and a first vertical blank period when the display apparatus is driven according to a first driving frequency, wherein a second frame includes a second active period and a second vertical blank period when the display apparatus is driven by a second driving frequency which is less than the first driving frequency, and wherein a length of the second active period is equal to a length of the first active period and a length of the second vertical blank period is greater than a length of the first vertical blank period.

10. The display apparatus of claim 8, wherein the driving controller is configured to generate the compensation value when the driving frequency is less than a reference driving frequency.

11. The display apparatus of claim 1, wherein the compensation value includes a first color compensation value, a second color compensation value and a third color compensation value, wherein the first color compensation value is a red compensation value, the second color compensation value is a green compensation value and the third color compensation value is a blue compensation value, and wherein the driving controller is configured to generate the red compensation value to maintain a second frame red grayscale value, the green compensation value to decrease a second frame green grayscale value and the blue compensation value to decrease a second frame blue grayscale value in the second frame.

12. The display apparatus of claim 11, wherein the green compensation value is generated based on the second frame red grayscale value and the second frame green grayscale value in the second frame, and wherein the blue compensation value is generated based on the second frame red grayscale value and the second frame blue grayscale value in the second frame.

13. The display apparatus of claim 11, wherein the second frame red grayscale value is VR2, the second frame green grayscale value is VG2, the second frame blue grayscale value is VB2, a second frame compensation red grayscale value is VR2', a second frame compensation green grayscale value is VG2' and a second frame compensation blue grayscale value is VB2° and MAX is a maximum function, and wherein VR2'=VR2*(VR2/MAX (VR2,VG2,VB2)), VG2'=VG2*(VG2/MAX (VR2,VG2,VB2)) and VB2'=VB2*(VB2/MAX (VR2,VG2,VB2)).

14. The display apparatus of claim 11, wherein the driving controller is configured to generate the blue compensation value to maintain a third frame blue grayscale value, the red compensation value to increase a third frame red grayscale value and the green compensation value to increase a third frame green grayscale value in the third frame.

15. The display apparatus of claim 14, wherein the red compensation value is generated based on a ratio of a difference between the third frame red grayscale value and the third frame blue grayscale value, and the third frame red grayscale value in the third frame, and wherein the green compensation value is generated based on a ratio of a difference between the third frame green grayscale value and the third frame blue grayscale value, and the third frame green grayscale value in the third frame.

16. The display apparatus of claim 14, wherein the third frame red grayscale value is VR3, the third frame green grayscale value is VG3, the third frame blue grayscale value is VB3, a third frame compensation red grayscale value is VR3', a third frame compensation green grayscale value is VG3' and a third frame compensation blue grayscale value is VB3' and MIN is a minimum function, and wherein VR3'=VR3*(1+(VR3−MIN (VR3,VG3,VB3))/VR3), VG3'=VG3*(1+(VG3−MIN(VR3,VG3,VB3))/VG3), and VB3'=VB3*(1+(VB3−MIN(VR3,VG3,VB3))/VB3).

17. A method of driving a display apparatus, the method comprising:

generating a power voltage;

outputting the power voltage to a display panel;

sensing a panel current of the display panel;

outputting an overcurrent signal when the panel current is greater than a threshold value;

generating a compensation value in response to the overcurrent signal;

generating a data signal to which the compensation value is applied;

generating a data voltage based on the data signal; and outputting the data voltage to the display panel, wherein an overcurrent mode is turned on immediately after the panel current exceeds the threshold value, and the overcurrent mode is maintained for at least one frame;

wherein the method further comprises:

generating, by a net power controller of a driving controller, intermediate image data by decreasing a grayscale value of input image data when a load of the input image data is greater than a reference load;

outputting the intermediate image data to a data operator of the driving controller that generates the data signal based on the intermediate image data and the compensation value;

turning off a net power control operation in a first frame based on a load of the input image data of a previous frame that immediately preceded the first frame being equal to or less than the reference load, and the overcurrent mode is turned off based on the panel current of the first frame being equal to or less than the threshold value;

turning off the net power control operation in a second frame which immediately follows the first frame based on the load of the input image data of the first frame being equal to or less than the reference load, and the overcurrent mode is immediately turned on based on the panel current of the second frame exceeding the threshold value; and turning on the net power control operation in a third frame which immediately follows the second frame based on the load of the input image data of the second frame being equal to or greater than the reference load, and a turn on state of the overcurrent mode is maintained in the third frame.

18. The method of claim 17, wherein the generating the compensation value comprises:

receiving the overcurrent signal from a current sensor; and generating the compensation value based on the intermediate image data and the overcurrent signal, and wherein the generating the data signal comprises processing the intermediate image data and the compensation value to generate the data signal.

19. The method of claim 18, further comprising:

generating a power voltage control signal for decreasing the power voltage in response to the overcurrent signal; and decreasing the power voltage based on the overcurrent signal.

20. The method of claim 18, further comprising determining a driving frequency based on the input image data, wherein the compensation value is generated when the driving frequency is less than a reference driving frequency.

* * * * *